United States Patent [19]

Kim

[11] Patent Number: 5,136,640
[45] Date of Patent: Aug. 4, 1992

[54] REPLACEABLE AROMATIC STICKER FOR USE IN A TELEPHONE HANDSET

[76] Inventor: Yun S. Kim, 543-16 Sungnae 1-Dong, Kangdong-Ku, Seoul, Rep. of Korea

[21] Appl. No.: 529,614

[22] Filed: May 29, 1990

[30] Foreign Application Priority Data

May 27, 1989 [KR] Rep. of Korea ............. 89-6961

[51] Int. Cl.$^5$ ............................................. H04M 1/00
[52] U.S. Cl. ................................. 379/452; 379/439
[58] Field of Search .............................. 379/452, 439

[56] References Cited

U.S. PATENT DOCUMENTS

| | | |
|---|---|---|
| 2,507,375 | 5/1950 | Hartwell et al. ............. 379/452 |
| 2,650,269 | 8/1953 | Webb . |
| 3,148,249 | 9/1964 | King . |
| 3,238,313 | 3/1966 | Kalogris ....................... 379/452 |
| 3,243,527 | 3/1966 | Sternheim ................... 379/452 |
| 3,530,261 | 9/1970 | Guim . |
| 3,589,106 | 6/1971 | Onuki ............................ 55/279 |
| 4,751,731 | 6/1988 | O'Connor ..................... 379/439 |
| 4,949,377 | 8/1990 | Nishina et al. ................ 379/452 |
| 4,953,703 | 9/1990 | Virginio ........................ 379/452 |

FOREIGN PATENT DOCUMENTS

| | | | |
|---|---|---|---|
| 2367388 | 6/1978 | France ........................... 379/452 |
| 0028651 | 2/1980 | Japan ............................. 379/439 |

*Primary Examiner*—Jin F. Ng
*Assistant Examiner*—Huyen D. Le
*Attorney, Agent, or Firm*—Birch, Stewart, Kolasch & Birch

[57] ABSTRACT

An aromatic sticker for use in a telephone handset, which comprises an aromatic fabric member with a communication hole and a raised bioprinting portion and a high density polyethylene net member with a hot melt adhesive for sticking on at least transmitting and/or receiving portions of the telephone handset for preventing the user from catching recurring colds or spreading diseases and giving pleasant scent for the user.

6 Claims, 1 Drawing Sheet

REPLACEABLE AROMATIC STICKER FOR USE IN A TELEPHONE HANDSET

BACKGROUND OF THE INVENTION

1. Field of the Invention

The present invention relates to a replaceable aromatic sticker for use in a telephone handset and more particularly, to a pad sticker comprising a fabric member impregnated with an antibiotic and/or a fragrance, a communication hole, a raised bioprinting portion, a high density polyethylene net member, and a hot melt adhesive for sticking on transmitting and/or receiving portions of the telephone handset for clearance and achieving a pleasant fragrance.

2. Description of the Prior Art

Various types of aromatic pads for use in a telephone handset are well known in the art. Such pads suffer from a number of problems such as, for example, such pads have difficulty in talk by telephone, the pleasant fragrance of such pads does not keep long, and such pads have a complicated structure. Further, such pads cannot destroy a foul odor generated by the fermentation of bacteria, virus, and microbe, and cannot protect the infection themselves.

SUMMARY OF THE INVENTION

Accordingly, it is an object of the present invention to provide an improved replaceable aromatic sticker for use in a telephone handset.

Another object of the present invention is to provide a replaceable aromatic sticker to be easily attached to at least transmitting and/or receiving portions of a telephone handset by removing a ring cover from the sticker and attaching it to the portions of the telephone handset, whereby the pleasant fragrance can be kept long for the user.

A further object of the present invention is to provide an aromatic sticker for a telephone handset which is economical to manufacture, durable in use, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an aromatic sticker for use in a telephone handset, which comprises an aromatic fabric member with a communication hole and a raised bioprinting portion and a high density polyethylene net member with a hot melt adhesive for sticking on at least transmitting and/or receiving portions of the telephone handset for preventing the user from catching recurring colds or spreading diseases and giving pleasant scent for the user.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
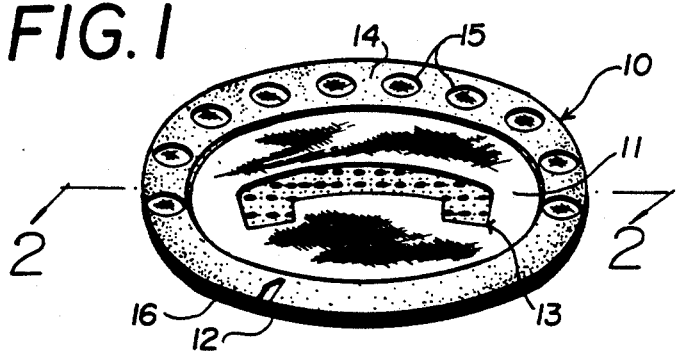
FIG. 1 is a perspective view of the replaceable aromatic sticker for use in a telephone handset according to the present invention.
Figure 2:
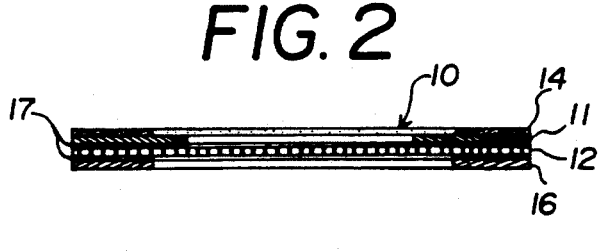
FIG. 2 is a sectional view of FIG. 1, taken along lines 2—2.

Referring now in detail to the drawings for the purpose of illustrating preferred embodiments of the present invention, the replaceable aromatic sticker 10 for use in a telephone handset as shown in FIGS. 1 and 2, comprises a fabric member 11 impregnated with an antibiotic and/or a fragrance and a non-woven fabric member 12 having same configuration as the fabric member and adhesively attached to the fabric 11 with an aromatic hot melt adhesive 17.

The fabric member 11 includes a designated communication hole 13 such as a telephone handset configuration disposed on the center portion thereof. Also, the aromatic fabric 11 is provided with a raised printing portion 14 disposed at the peripheral surface of the fabric member and having a designated configuration such as a telephone dial 15 (FIG. 1). The printing portion 14 is formed by the conventional transcription printing method. That is, the transcription printing method is impregnated with micropowder of viscose rayon treated by an antibiotic and a fragrance. The hot melt adhesive 17 is treated by the conventional sterilization method and is impregnated with a fragrance for keeping it for a long time.

Figure 3:
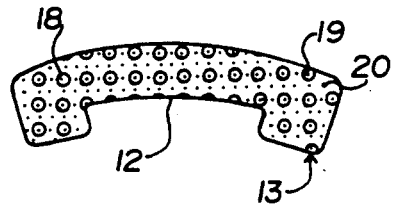
FIG. 3 is an enlarged top plan view of a net member according to the present invention.
Figure 4:
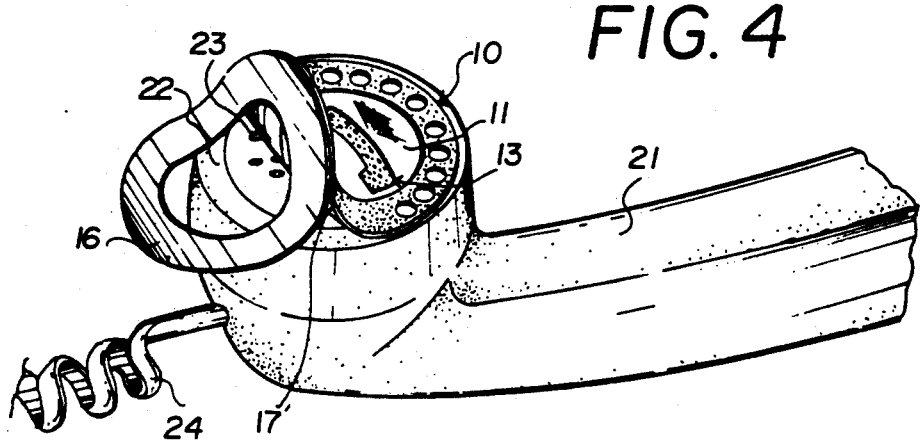
FIG. 4 is a perspective view of the replaceable aromatic sticker according to the present invention showing how to attach it to the transmitting portion of the telephone handset.

The high density polyethylene net member 12 attached to the aromatic fabric 11 with the aromatic adhesive 17 on the upper surface thereof includes an adhesive layer 17' with the aromatic adhesive 17 disposed on the circumferential surface of the lower surface thereof for covering a ring cover 16 so as to easily mount on a peripheral surface 22 of at least transmitting and receiving portions of a telephone handset 21 such as, for example, the transmitting portion of the telephone handset 21 (FIG. 3). At that time, since a plurality of apertures 23 are disposed on a slight groove portion of the end portions of the telephone handset 21 and the sticker 10 does not attach to the around area of the plurality of apertures 23, the talk communication is very well when compared with the conventional aromatic pads. The telephone handset 21 has a telephone wire 24.

As shown in FIG. 3, the high density polyethylene (hereinafter "HDPE") net member 12 is "DEL NET". The HDPE net member 12 includes a plurality of raised balls 18 disposed on one surface thereof. Each of a plurality of microapertures 19 and 20 is disposed on the raised ball 18 and the area disposed among the raised balls 18, respectively, for filtering waste material such as dust or saliva while the user uses the telephone handset 21. Therefore, any dust or saliva does not penetrate into telephone apertures 23 of the telephone handset 21. Also, the HDPE is a boss type of "P520" as an unit which has 0.802/yd$^2$ of weight, 32.0 of boss count machine or roll direction, 35.0 of boss count cross direction, 4.3 miles of thickness, 5.0 lbs/in of tensive strength machine or roll direction, 4.5 lbs/in of tensive strength machine or roll direction, and 323.0 ft$^3$/min/ft$^2$ of frazier air permeability.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A replaceable aromatic sticker for use in a telephone handset, which comprises:

a fabric member impregnated with an antibiotic and/or a fragrance, said fabric member including a communication hole disposed at the center portion thereof and a raised printing portion disposed at the peripheral surface of said fabric member, a non-woven fabric member having same configuration as said fabric member and adhesively attached to said fabric member on the opposite side from said raised printing portion, said non-woven fabric member being a high density polyethylene net member and including a plurality of raised balls disposed thereon, each of said raised ball having a microaperture disposed therein for effectively filtering dust and saliva and communicating with a plurality of apertures disposed on transmitting and receiving portions of the handset, an adhesive layer provided at the circumferential surface of said non-woven fabric member, and a removal ring cover for covering said adhesive layer of said circumferential surface, whereby upon removing the removable ring cover from the sticker, the sticker can be attached to at least the transmitting and/or receiving portions of the telephone handset for clearance and achieving a pleasant fragrance.

2. The replaceable aromatic sticker of claim 1, wherein the communication hole has a designated configuration.

3. The replaceable aromatic sticker of claim 1, wherein the raised printing portion has a designated configuration.

4. The replaceable aromatic sticker of claim 3, wherein the raised printing portion is impregnated with an amount of micropowder of a viscose rayon and a fragrance.

5. The replaceable aromatic sticker of claim 1, wherein the adhesive is impregnated with an antibiotic and a fragrance.

6. The replaceable aromatic sticker of claim 5, wherein the adhesive is a hot melt adhesive.

* * * * *